United States Patent Office 2,712,361
Patented July 5, 1955

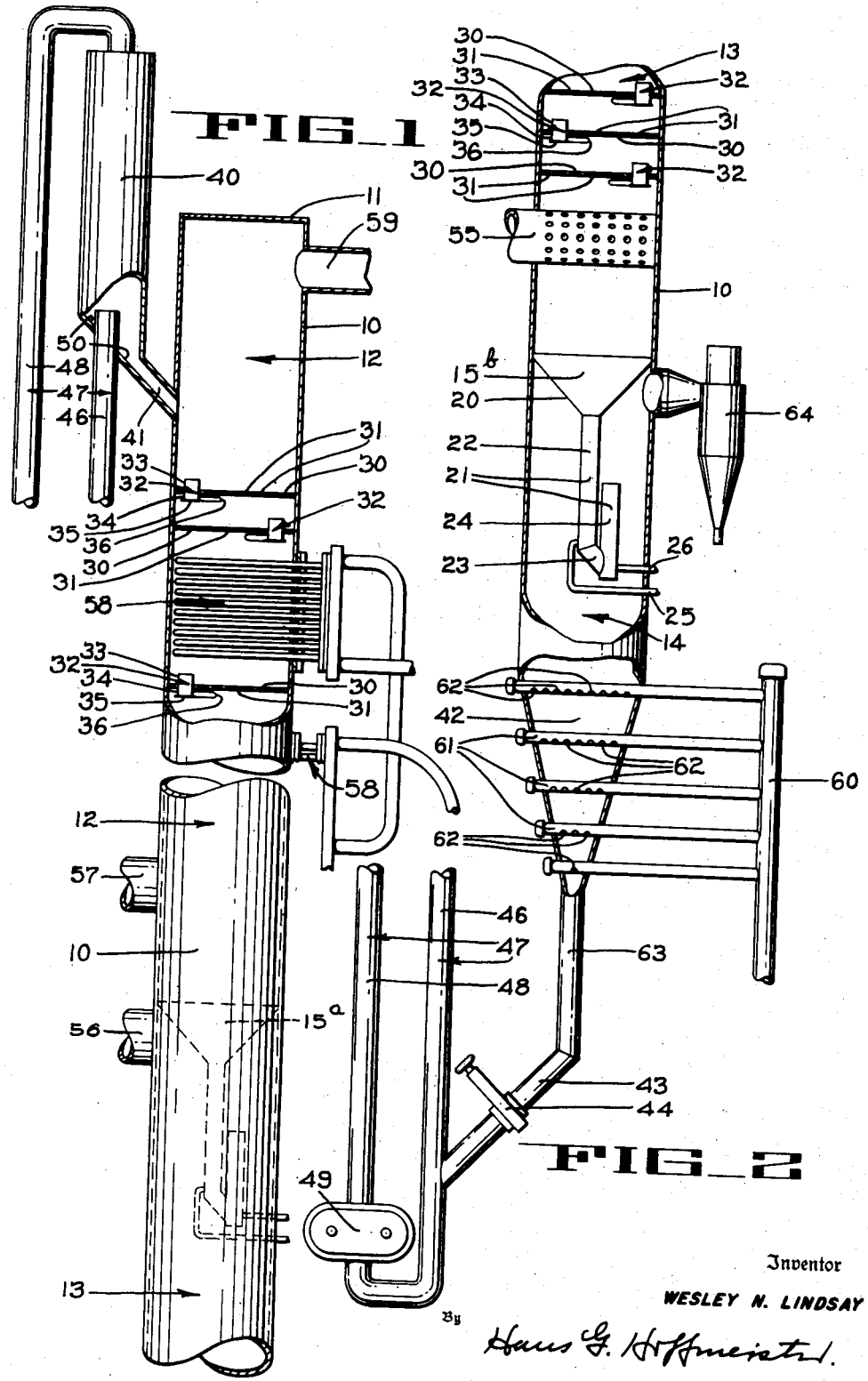

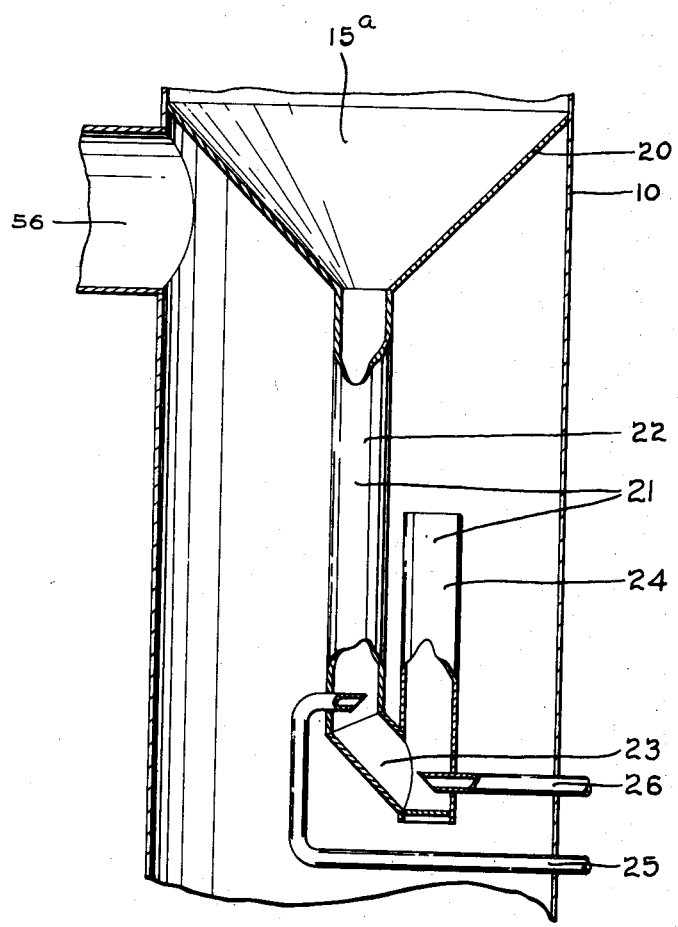
FIG_3

2,712,361

APPARATUS FOR CONTACTING GASEOUS FLUIDS WITH GRANULAR SOLIDS, AND VALVE THEREFOR

Wesley N. Lindsay, San Jose, Calif., assignor to Food Machinery and Chemical Corporation, San Jose, Calif., a corporation of Delaware Application October 2, 1952, Serial No. 312,735

1 Claim. (Cl. 183—4.2)

The present invention relates to apparatus for contacting gaseous fluids with granular solids. More particularly, the present invention relates to valves for granular solids, such as may be provided to subdivide apparatus of the type referred to into a plurality of superposed processing chambers.

This is a continuation in part of U. S. patent application Serial No. 121,849 filed October 17, 1949, now abandoned.

In processes involving intimate contact of gaseous fluids and granular solids, such as the separation of gases from each other, the catalytic conversion of hydro-carbons and the like, it is necessary that the granular solids employed for adsorbing a gas from a gas mixture or for catalyzing the cracking of hydro-carbons be subsequently contacted with a different gas stream to recondition them for renewed use and/or to recover the adsorbed constituent in concentrated form. To effect both, the primary process and the reconditioning process within a single enclosure, it is therefore necessary to provide valves within the apparatus that will readily pass the granular solids from higher to lower zones of said apparatus, but will effectively inhibit the exchange of gases between said zones.

It is an object of the present invention to provide a contacting apparatus, of the type referred to, which comprises separate processing chambers within a common enclosure and wherein granular solids are permitted to pass from upper to lower ones of said chambers while any exchange of gases between said chambers is effectively inhibited.

Another object is to provide a method of transferring granular material in continuous flow from one gas stream to another gas stream while effectively preventing any contact of the gases of said gas streams with each other.

Another object is to provide a valve for use between the individual chambers, of an apparatus of the type referred to, which effectively inhibits the exchange of gases or vapors between said chambers but permits continuous flow of the granular solids from higher to lower chambers.

Still another object is to provide a valve, of the type referred to, that retains its effectiveness in inhibiting the exchange of gases or vapors between said chambers over a wide range of variations in the flow rate of the granular material passing therethrough.

An additional object is to provide a valve, of the type referred to, that retains its effectiveness in inhibiting the exchange of gases or vapors between said chambers, even though flow of the granular material through said valve may cease completely.

The granular solids, employed in processes of the type mentioned above are frequently of a brittle nature. In circulating them through apparatus of the kind described, care must therefore be taken to keep strains, such as may grind them to smaller sizes or cause them to split into fragments at a minimum, because under-sized granules are likely to be carried along by the gas stream and must be continually replaced to maintain the circulating stream of granular material at the required level.

It is another object of the present invention, therefore, to provide a valve for granular solids which, while effectively inhibiting the passage of gases permits continuous flow of the comminuted solids without contributing appreciably to the attrition of the individual granules thereof.

Still another object is to provide a valve, of the type referred to, which operates in the required manner without involving any mechanical movement of its components, such as may crush or shear the granules of the comminuted material passing therethrough.

These and other objects of my invention will be apparent from the following description of the accompanying drawings which illustrate a preferred embodiment thereof and wherein:

Figures 1 and 2 are fragmentary vertical sections through a multi-chamber contacting apparatus for gaseous fluids and granular solids constructed in accordance with my invention.

And Figure 3 is a sectional detail view illustrating on a somewhat larger scale the valve employed in the apparatus illustrated in Figures 1 and 2.

Referring first to Figure 1 the apparatus of the invention comprises an outer tubular wall 10 which is closed at the top as indicated at 11. The space within said tubular wall is subdivided into three vertically superposed processing chambers 12, 13, and 14 by two valving mechanisms 15a and 15b, respectively, which are of identical construction and which are adapted to pass granular solids while preventing the exchange of gases that may circulate within the individual processing chambers. Each of said valves comprises a funnel 20 (Fig. 3) which is suitably secured to the cylindrical wall 10 of the apparatus with its diverging end forming the bottom of an upper processing chamber. Said funnel has the usual tubular extension 21, as shown, but only the initial run 22 of said tubular extension is downwardly directed, its lower end being turned sideways to form a laterally sloping run 23 which in turn is bent upwardly in the manner of a knee to form an upwardly directed substantially vertical terminal run 24 that discharges into a lower processing chamber at a level substantially below the entrance point of the downwardly directed run 22. A duct 25 of small diameter leads into the downwardly directed run 22 of the funnel tube 21 in the region where it passes into the laterally sloping center run 23, while another duct 26 of small diameter leads into the tube 21 in the region where its terminal run 24 rises from the laterally sloping center run 23.

In operation the granules descending through the upper processing chamber are gathered in funnel 20 and flow into the downwardly directed run 22 of the tubular funnel extension 21. A gas stream is injected through the duct 25 into said downwardly directed run at the bottom end thereof. Said gas stream is not strong enough to blow the granules back into the upper processing chamber but it is sufficiently strong to keep the descending granules in fluid suspension. Hence, the granules drop through the downwardly directed run of the tube 21 in a loose condition. Below the gas stream injected through tube 25, however, the granules assume a relatively dense condition, but with the sloping center run 23 of the funnel tube 21 sufficiently steep, as illustrated in Fig. 3, the relatively dense mass of granules slides down said center run to its lowest point. There a gas stream injected through the duct 26 places the mass of granules again into such a loose condition as will enable said granules to rise with said second gas stream through the vertical terminal run 24 of the funnel tube to the upper end thereof from where they spill into the lower processing chamber in much the same manner as liquid flowing from an upper level through an inverted knee-shaped tube of the type described. Thus, the granules dropping through the upper processing chamber may pass through the valve in continuous flow from said upper chamber into the lower processing chamber without being subjected to any shearing or crushing strain, since the valve comprises no moving components; and if the duct 25 is arranged to inject the same type of gaseous fluid into the funnel tube 21 as passes through the upper processing chamber and the duct 26 is arranged to inject into the funnel tube 21 the same type of gaseous fluid as passes through the lower processing chamber, there is no possibility for any dilution of the gases circulating through the individual processing chambers nor for any appreciable exchange of gases between said chambers; for the gas stream injected into the tube 21 through the duct 25 returns to the upper chamber through the initial run 22 of said tube while the gas stream injected into the tube 21 through the duct 26 returns to the lower chamber through the terminal run of the said tube, with the relatively dense mass of granules sliding down its sloping center run 23 through what is a doldrum region between the above mentioned gas current forming a satisfactory gas-separating seal. Said seal will automatically remain effective over a wide range of variations in the flow rate of the granular material through the funnel tube 21 so that no manual adjustment of any kind is required. It will remain effective and prevent the interchange of gases between the upper and lower chambers even if the flow of granular material should cease completely.

Reverting to Figs. 1 and 2 the upper processing chamber 12 and the middle processing chamber 13 are preferably provided with a plurality of vertically spaced horizontal plates 30 which are perforated as indicated at 31. Tubular down-spouts 32 extend through each of said plates and may project a limited distance above their respective plates as shown at 33. Their downwardly projecting lower ends 34 are provided with suitable lids 35 that are yieldably held in a closed or nearly closed position by means of spring members 36.

The granular solids to be circulated through the chambers 12, 13 and 14 are delivered into the apparatus from an exteriorly positioned hopper-shaped vessel 40 through an inclined passage 41 which leads into the chamber 12 at its upper end above the uppermost one of its perforated plates 30, and after said granular solids have passed downwardly through all three of the chambers, defined by the valves 15a and 15b, they collect in the funnel shaped bottom 42 of the apparatus from where they are discharged through an inclined conduit 43, controlled by a valve 44, into the ascending run 46 of an air lift circuit 47, the descending run 48 of which contains a suitable blower 49. The blast of air produced by said blower lifts the discharged granules within said ascending run 46 to the aforementioned hopper 40. Said hopper is sufficiently larger in diameter than the conduit that forms the ascending run of the air lift circuit to permit expansion, and thus cause deceleration, of the air blast produced by the blower 49 to an extent where it can no longer support the entrained granules. Said granules therefore drop upon the sloping floor 50 of said hopper 40 from where they slide down the previously described inclined passage 41 and enter the enclosure 10 anew while the air delivered into the hopper 40 by the blower 49 is returned to the input opening of said blower through the descending conduit 48.

The contacting apparatus illustrated by way of example in Figs. 1 and 2 is especially designed to serve as a drier for the effluent combustion gases of a nitrogen fixation furnace by effecting intimate contact of said gases with a stream of granules of a dry adsorbent material, such as silica gel, activated alumina, and the like, the arrangement being such that the actual moisture adsorption process is housed in the uppermost processing chamber 12, while the lower chambers 13 and 14 serve to recondition the moisture laden granules of adsorbent material for renewed use.

To this end the hot effluent combustion gases of the furnace may first be conducted into the middle chamber 13 in order that their heat may be utilized to drive the moisture from the spent granules of adsorbent material that enter said chamber from the adsorber chamber 12 through the valving mechanism 15a. Having specific reference to Fig. 2, the hot furnace gases are conducted through a pipe 55 into the bottom portion of chamber 13 from where they rise in many currents through the perforated bed plates 30 against the descending stream of moisture laden granules and discharge through an exhaust conduit 56 provided at the upper end of said chamber.

The maximum dimension of the granules employed is preferably of the order of from 1/8 to 1/16 of an inch and by means of a suitable blower (not shown) the velocity of the gas currents rising within the chamber 13 is adjusted to a suitable value such as five feet per second (measured in unobstructed portions of the chamber at 60° F. and a pressure of one atmosphere) at which said granular solids are maintained in a state of dense phase fluidization on and above the various bed plates 30 provided in the chamber 13, with a limited portion thereof spilling continually into the down spouts 32 from where they are permitted to flow into lower beds. Thus, the solid granules of adsorbent material may be made to reach the bottom of chamber 13 after having been in intimate contact with the rising currents of the hot furnace gases for a sufficient period of time to cause evaporation of previously adsorbed moisture, so that the granules collecting in the funnel 20 of the lower valving mechanism 15b are thoroughly dry, while the moisture released from their pores is entrained in, and escapes with, the furnace gases through the exhaust conduit 56.

In passing through the processing chamber 13 the furnace gases have cooled materially, but the gases that leave the chamber 13 through the exhaust conduit 56 are still too hot to permit effective adsorption of their moisture if directly contacted with the dry solid adsorbents that pass through the uppermost processing chamber 12. Therefore, before being conducted into said chamber, they should first be subjected to a shower of a cooling liquid, such as water, brine, dilute acid, or the like, which may be effected in a separate cooling tower (not shown) and which will not only reduce the temperature of said gases to a suitable level for the actual drying operation but will also cause a portion of the water vapor contained in said gases to condense.

Thus cooled and relieved of part of their moisture, the furnace gases may now be conducted by a conduit 57 into the bottom of the adsorber chamber 12, from where they rise in many currents through the perforations 31 in the bed plates 30 while a stream of cold dry granules of adsorbent material pours into said chamber from the hopper 40, forming fluidized beds on each of said plates 30, with said granules descending gradually through the spouts 32 from the top to the bottom of the chamber 12 in a manner previously described. Thus, the granular adsorbent and the furnace gases are intimately contacted with one another for a sufficient period of time to enable said adsorbent to extract practically all of the moisture contained in said gases.

Suitable heat exchangers 58 may be provided between the bed plates of the adsorber chamber 12 to constantly remove the heat generated by the adsorption process, and thus maintain said chamber at a temperature level at which the described dehumidification process of the furnace gases may effectively proceed.

The dry furnace gases leave the adsorber chamber 12 at the top end thereof through a conduit 59. The moisture laden granules, however, that reach the bottom of the adsorber chamber 12 are passed by the valve 15a in the previously described manner into the regenerator chamber 13 without being subjected to any undue crushing or shearing strains and without there being a possibility for the hot and humid furnace gases passing through the regenerator chamber to penetrate through said valve into adsorber chamber 12 and interfere with the proper performance of the adsorption process. In the regenerator chamber the granular adsorbent is freed from the moisture, accumulated in its pores, by contact with the hot furnace gases as previously described, whereupon the dry granules are passed through the valve 15b without injury into the bottom chamber 14 where they are contacted with a gaseous chilling medium to restore their effectiveness as adsorbents. In the particular embodiment of the invention as illustrated in Fig. 2 the lower portion 42 of the chamber 14 is shaped in the manner of a slender cone as previously pointed out, and arranged exteriorly of said cone is a vertically positioned intake manifold 60 provided with a plurality of horizontal branch pipes 61. Said branch pipes extend through the bottom portion 42 of the chamber 14 and interiorly of said chamber each of the branch pipes 61 is provided with a plurality of downwardly directed apertures 62 through which cool dry air may be introduced into the chamber 14. Said air rises against the descending stream of granules and adsorbs their heat, so that the granules passing into the downwardly directed tubular extension 63 of the cone shaped chamber bottom 42 are properly cooled. From said tubular extension 63 the cool dry granules slide along the previously mentioned passage 43 into the ascending branch 46 of the air lift circuit 47 to be returned through hopper 40 to the upper end of the drying apparatus as previously explained, while the air introduced through the pipes 61 is allowed to escape into the outside atmosphere through a cyclone 64 located at the upper end of the chamber 14 directly below the conical funnel 20 of the valve 15b.

The described apparatus for treating gaseous fluids by contact with granular solids is a self-contained unit, wherein the granular solids, upon contact with the gaseous fluids to be treated, are continually reconditioned for renewed use, so that whatever process is to be performed by contacting said gaseous fluids with granular solids may be uninterruptedly carried out with a relatively limited amount of the granular material. Due to the nature of the valves arranged between the individual processing chambers of the apparatus as provided by the present invention, said granular material may pass from chamber to chamber without being subjected to other than normal attritional strains, and yet exchange of the gases passing through the individual chambers is effectively inhibited. Hence, the processes performed in the individual chambers may be carried out under most favorable conditions, without the danger that the gaseous fluids circulating in one chamber may penetrate into another chamber and unfavorably interfere with the process performed therein.

While I have described my invention with the aid of a particular exemplary embodiment thereof, it will be understood that I do not wish to be limited to the specific constructional details shown and described, which may be departed from without departing from the scope and spirit of my invention.

I claim:

Apparatus for sequentially contacting granular solids with first and second gaseous fluids including an enclosure of predominantly vertical compass, means for delivering granular solids into said enclosure at the upper end thereof, means for discharging granular solids from said enclosure at the lower end thereof, partitioning means dividing said enclosure into an upper and lower chamber in a manner permitting granular solids to pass from said upper to said lower chamber while inhibiting the interchange of gaseous fluids between said chambers, inlet pipes for introducing said first and second gaseous fluids, respectively, into said first and second chambers at the lower ends thereof, and outlet pipes for exhausting the gaseous fluids from said chambers at the upper ends thereof, said partitioning means comprising an imperforate plate separating said first and second chambers from each other, a tubular conduit establishing communication between said chambers and extending below said plate, said tubular conduit having an initial downwardly directed run, a laterally sloping center run adjoining said initial run at the lower end thereof and being sufficiently steep to cause granular solids entering it through said initial run to slide downwardly to its lowest point, and a terminal run rising substantially vertically from the lowest point of said center run and discharging into said lower chamber, a first duct leading into said initial run at the lower end thereof for introducing a stream of said first gaseous fluid into said initial run at a velocity adapted to maintain granular solids entering said initial run from said upper chamber in a state of fluid suspension, and a second duct leading into said terminal run at the lower end thereof for introducing into said terminal run a stream of said second gaseous fluid at a velocity adapted to fluidize granular solids entering said terminal run and to carry them into said lower chamber.

References Cited in the file of this patent

UNITED STATES PATENTS

| | | |
|---|---|---|
| 1,422,007 | Soddy | July 4, 1922 |
| 2,304,128 | Thomas | Dec. 8, 1942 |
| 2,311,564 | Munday | Feb. 16, 1943 |
| 2,379,195 | Simpson et al. | June 26, 1945 |
| 2,432,298 | Eastwood et al. | Dec. 9, 1947 |
| 2,434,202 | Evans et al. | Jan. 6, 1948 |
| 2,520,983 | Wilcox | Sept. 5, 1950 |
| 2,540,373 | McAfee | Feb. 6, 1951 |

FOREIGN PATENTS

| | | |
|---|---|---|
| 913,211 | France | May 20, 1946 |